Oct. 18, 1955        C. E. CARTER        2,721,136
PROCESS FOR DEMETALLING HYDROFORMYLATION STAGE PRODUCTS
Filed June 18 1951
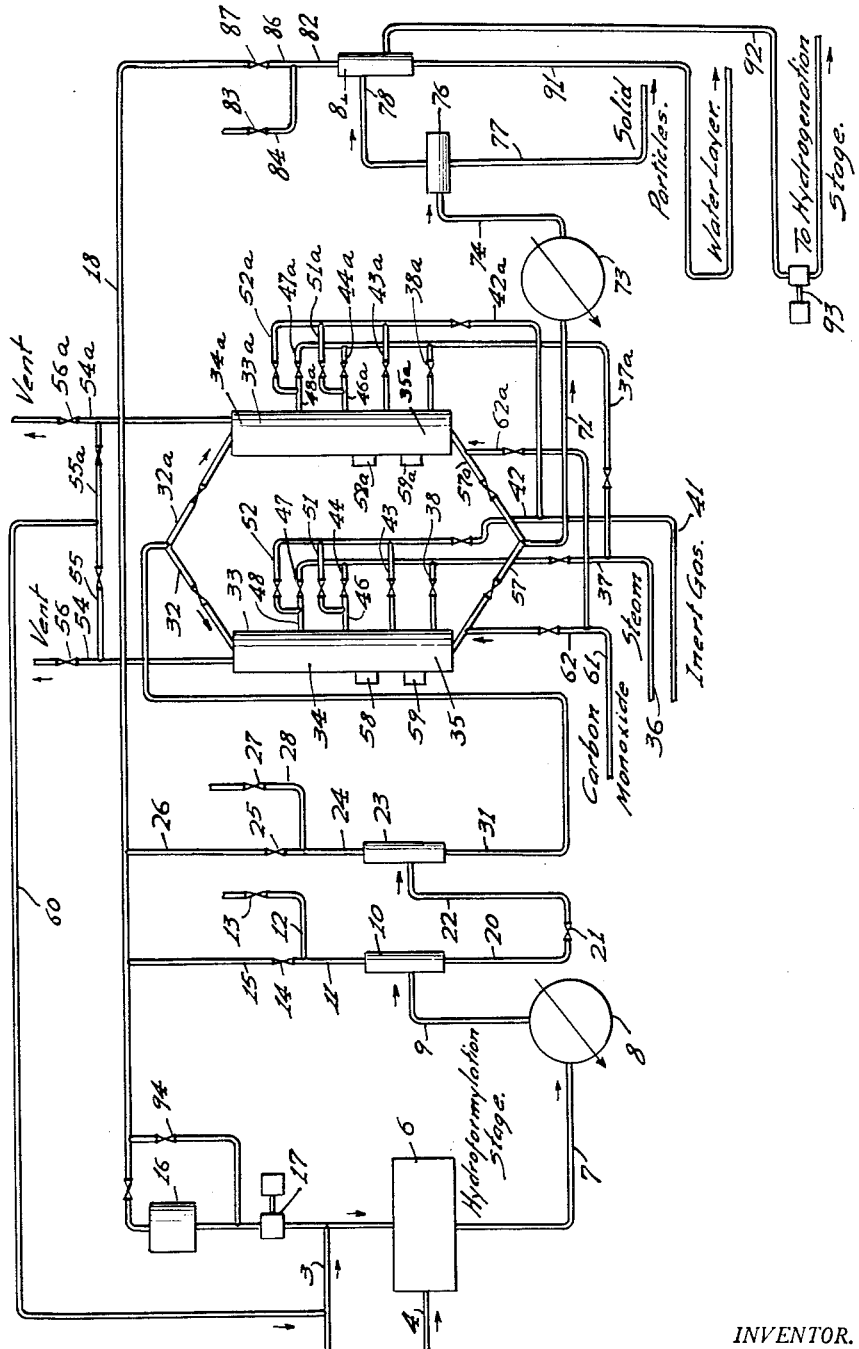
INVENTOR.
Charles E. Carter.
BY A. M. Houghton
his ATTORNEY:

United States Patent Office 2,721,136
Patented Oct. 18, 1955

2,721,136

PROCESS FOR DEMETALLING HYDROFORMYLATION STAGE PRODUCTS

Charles E. Carter, Canonsburg, Pa., assignor to Gulf Oil Corporation, Pittsburgh, Pa., a corporation of Pennsylvania Application June 18, 1951, Serial No. 232,198

7 Claims. (Cl. 75—108)

This invention relates to a process for removing metals from a stream containing the metals as carbonyls. More particularly, this invention relates to a process for removing catalytic metals and metals employed for making steel alloys from hydroformylation stage products containing the metals as carbonyls.

During the hydroformylation of olefins, which is also known as the carbonylation or oxonation of olefins, a product stream is produced which contains a mixture of hydroformylation reaction products and unreacted olefins, carbon monoxide, and hydrogen. The hydroformylation reaction products usually contain a large proportion of aldehydes and smaller proportions of alcohols, acetals, and other organic compounds. The product stream discharged from the hydroformylation stage is at a hydroformylation pressure which is usually in the range of about 1500 to about 4500 pounds per square inch, and a hydroformylation temperature in the range of about 100° to about 600° F.

The hydroformylation product stream also contains dissolved in the mixture of reaction products and unreacted olefins a catalytic metal carbonyl. The catalytic metal is originally introduced into the hydroformylation reaction stage as the carbonyl or is converted to the carbonyl in the reaction zone. Cobalt or iron is usually employed as the catalytic metal.

The hydroformylation reaction zone and the transfer lines used in the hydroformylation stage are usually made of iron or iron alloys. The reactants in the hydroformylation stage slowly dissolve the walls of the reactor and the transfer lines. In this way iron carbonyl is produced when the walls of the reactor and the transfer lines are constructed of iron alloys. The alloying metal carbonyls in addition to iron carbonyls usually comprise those of nickel, chromium, and molybdenum. The hydroformylation reaction products, the unreacted olefins, carbon monoxide, and hydrogen and the dissolved carbonyls together comprise the hydroformylation stage products or the total reaction products from the hydroformylation stage.

It is desirable to remove the metal carbonyls from the reaction products as the first step in recovering aldehydes and other hydroformylation reaction products from these products because the metal carbonyls catalyze condensation reactions of the aldehydes at the temperatures usually employed for separating the aldehydes. In addition when the hydroformylation stage products are sent directly to a hydrogenation stage in an Oxo process formed of these two stages, it is also desirable to remove the metal carbonyls. Under the usual conditions of hydrogenation, carbonyls present in a charge material are decomposed and the metals are deposited upon the hydrogenation catalyst. When an appreciable amount of a catalytic metal such as iron or cobalt is deposited upon a hydrogenation catalyst, the efficiency of the hydrogenation catalyst is appreciably reduced because the surface of the catalyst is covered with the catalytic metal. In addition, when iron and alloying metal carbonyls are decomposed in a hydrogenation zone, carbon monoxide and free metals which are released act as poisons for a number of hydrogenation catalysts. When such a catalyst is employed in the hydrogenation stage, even a small amount of carbon monoxide or a small amount of any of these metals deposited upon the catalyst causes a substantial reduction in yield in the hydrogenation stage.

When cobalt is employed as the catalytic metal, it is also desirable to separately recover the cobalt in order that it can be reprocessed and recycled.

I have found that either a catalytic metal carbonyl or catalytic metal and alloying metal carbonyls can be removed from hydroformylation stage products containing the carbonyl or carbonyls by passing the hydroformylation stage products initially at a temperature below the decomposition temperature of the metal carbonyl with the lowest decomposition temperature downwardly from the upper portion of an elongated separation zone containing packing material, passing steam upwardly from a point in the lower portion of the separation zone, passing inert gas upwardly from at least one point above the first-named point where the steam is introduced, and causing cooling and condensation of the steam by contacting the steam with the hydroformylation stage products and the packing material and by reducing the partial pressure of the steam with the inert gas. The amount and pressure of the steam and the amount and temperature of the inert gas and the separation pressure are adjusted so that upon condensation of steam the hydroformylation stage products in the reaction zone are heated above the decomposition temperature of the catalytic metal or alloying metal carbonyl with the highest decomposition temperature, thus forming at least one free metal and depositing the metal on the packing material. I have further found that preferred results are obtained in the separation of catalytic metal or other alloying metal carbonyls from hydroformylation stage products by introducing additional steam and inert gas at a plurality of points spaced in vertical relationship above the point where the inert gas is initially introduced.

It is a feature of my invention that at least a substantial amount and preferably substantially all of the steam introduced into the separation zone is condensed and removed as water and thus the latent heat of the steam introduced into the separation zone is effectively employed in heating the hydroformylation stage products.

I have found that by operating in accordance with my invention, the temperature in the separation zone varies gradually from the temperature of the top of the separation zone to the temperature at the bottom of the separation zone. Because of the resulting temperature gradient, when hydroformylation stage products containing either catalytic or alloying metal carbonyls are treated in accordance with my invention, the resulting metal or metals are uniformly distributed throughout the separation zone upon the packing material in the separation zone. When hydroformylation stage products containing both cobalt and alloying metals are treated in this manner, cobalt is uniformly deposited upon the packing material in an upper portion of the separation zone and other alloying metals are uniformly deposited upon the packing material in the lower portion of the separation zone. The packing material upon which cobalt is deposited and the packing material upon which other alloying metal carbonyls are deposited can be separately removed from the separation zone and the cobalt can be recovered. In addition, because the hydroformylation stage products usually contain a much larger amount of cobalt than other alloying metal carbonyls, the packing material in the upper portion of the separation zone can be removed more frequently than the packing material in the lower portion of the separation zone.

The temperature gradient which is employed in the separation zone depends upon the metal carbonyl or carbonyls which are to be removed in that separation zone. In general, cobalt carbonyl is effectively decomposed at a separation temperature in the range of 165° to 212° F. A temperature in the range of from about 340° to about 420° F. gives preferred results for the removal of iron, nickel, chromium and molybdenum carbonyls. The temperature gradient in the separation zone is determined by the initial temperature of the hydroformylation stage products introduced into the top of the separation zone and the final temperature of the hydroformylation stage products removed from the bottom of the separation zone.

The initial temperature of the hydroformylation stage products should be sufficiently low so that metal carbonyls are not deposited in large amounts either in the inlet lines to the separation zone or the upper portion of the separation zone. Either of these occurrences would substantially reduce the on-stream time of the separation zone because of the plugging of the inlet lines or the top portion of the separation zone.

When the separation zone is used to remove cobalt carbonyl, the initial temperature of the hydroformylation stage products should be below 165° F. in order to prevent premature deposition of the cobalt. When the hydroformylation stage products contain only iron carbonyl or alloying metal carbonyls, the alloying metals introduced into the separation zone should be at an initial temperature of below 340° F. and preferably below 300° F. in order to deposit the iron or alloying metals uniformly in the separation zone.

In addition, inert gas is removed from the upper portion of the separation zone at a temperature fixed by the initial temperature of the hydroformylation reaction products. An initial hydroformylation stage products temperature below 150° F. and preferably in the range of 100° to 120° F. is preferred even when the hydroformylation stage products contain only iron carbonyl or other alloying metal carbonyls because when the inert gas is removed at such low temperatures, it is substantially free of hydroformylation stage products. When the inert gas is removed at a higher temperature, such as a temperature in the range of 250° to 300° F., it is removed mixed with vapors of hydroformylation products and it is necessary to separate the products removed with the inert gas in an additional separation zone if the products are to be recovered.

The highest temperature in the separation zone, the temperature at the bottom of the separation zone, is determined by the partial pressure of steam in this portion of the separation zone. The steam which is employed can be wet, dry or it can be superheated. The water which results from the condensation of steam passes down through the separation zone mixed with the liquid hydroformylation stage products. The amount and pressure of the steam introduced into the bottom of the separation zone are adjusted to obtain a partial pressure of steam which is such that the mixture of hydroformylation stage products and condensed steam in equilibrium with the steam is heated above the decomposition temperature of the highest decomposition temperature carbonyl which is to be removed. When the separation zone is being operated under conditions which are adjusted to remove only cobalt carbonyl, a separation pressure of one atmosphere is preferably employed and steam is introduced at slightly above this pressure to obtain a separation temperature in the separation zone in the range of 165° to 212° F. However, adequate results can be obtained at higher total pressures, but in such cases, the partial pressure of the steam is preferably maintained not substantially above atmospheric. When the separation zone is operated to remove alloying metal carbonyls, a higher partial pressure of steam and a total pressure above atmospheric are necessary in the separation zone. In order to remove these carbonyls, steam is preferably introduced at a pressure of about 200 to 300 pounds per square inch gauge in an amount sufficient to obtain a partial pressure of steam in the bottom of the separation zone of about 100 to about 300 pounds per square inch gauge, thus heating the mixture of hydroformylation stage products and condensed steam in the lower portion of the separation zone to a temperature of about 340° to about 420° F.

A gas which does not react with the hydroformylation stage products in the separation zone such as hydrogen, nitrogen, methane or natural gas, and the like, can be employed as the inert gas. The inert gas, upon its introduction to the separation zone initially at a point above the point where the steam is introduced at or near the bottom of the separation zone mixes with the steam and decreases the partial pressure of the steam. This decrease in partial pressure of the steam causes a gradual temperature change through the separation zone. The inert gas can be introduced at any temperature at which it is available. It is desirable that it be at a temperature approximating the temperature within the separation zone at the point where it is introduced in order to obtain a uniform deposition of metals. However, the inert gas is frequently available at or slightly above atmospheric temperature such as a temperature of about 100° F. and inert gas at such a temperature can efficiently be employed.

The number of points along the vertical length of the separation zone into which additional steam and additional inert gas are introduced depends upon the temperature gradient desired in the separation zone, the temperature of the inert gas, and the vertical height of the separation zone. For example, with a small tower six feet high and less than three inches in diameter, in which heat conduction by the vessel walls is a factor, one point of introduction of inert gas is sufficient while with a commercial tower about 25 feet high and a diameter such as three feet, better results are obtained when steam is introduced into the bottom, inert gas is introduced at the three-foot level, and additional inert gas or a mixture of additional inert gas and steam is introduced at the eight-foot level and the thirteen-foot level.

The hydroformylation reaction products removed from the hydroformylation stage are brought into a demetalling tower, which is used as a separation zone, at the desired separation pressure and at a temperature below the decomposition temperature of the catalytic or alloying metal with the lowest decomposition temperature.

It is an advantage of my invention that when an intermediate separation pressure such as a pressure of about 450 pounds per square inch gauge and an initial temperature of about 100° F. are employed, the synthesis gas, carbon monoxide and hydrogen, which is dissolved in the hydroformylation stage products at this pressure and temperature is gradually released in the demetalling tower with the increase in temperature which occurs as the hydroformylation stage products pass downwardly through the demetalling tower. This is advantageous because the synthesis gas acts as an additional diluent and further reduces the partial pressure of the steam as it is released, with a consequent reduction in amount of inert diluent gas to be added. For this reason it is advantageous to introduce into the demetalling tower, hydroformylation products which contain dissolved synthesis gas. However, an embodiment of my invention can be carried out by separating synthesis gas from the hydroformylation stage products prior to introducing the products into a demetalling tower. Thus, the hydroformylation stage products can be initially depressured and cooled to substantially atmospheric pressure and a temperature of about 100° F. and can then be recompressed to a pressure of about 450 pounds per square inch gauge. However, the preferred embodiment discussed above, in which the synthesis gas is retained in the hydroformylation products, has the important advantage that the necessity for this depressuring and recompressing is eliminated.

An embodiment will now be described in which cobalt and a mixture of iron and other alloying elements are separately removed in accordance with the process of my invention from a mixed phase mixture of liquid reaction products and gaseous synthesis gas, the mixed phase being formed by reducing the pressure on a liquid phase containing the components at a higher pressure. The embodiment will be described in conjunction with the single figure of the drawing. This figure is a simplified flow sheet of apparatus suitable for use in carrying out my invention.

Referring to the drawing, synthesis gas comprising a mixture of carbon monoxide and hydrogen is introduced by line 3 and a mixture of cobalt 2-ethylhexanoate and olefins is introduced by means of line 4 to hydroformylation stage 6 which is maintained at a pressure of about 3500 pounds per square inch and a temperature of about 360° F. In the hydroformylation stage, the olefins react with the carbon monoxide and hydrogen to form hydroformylation reaction products which are chiefly aldehydes but which also include smaller amounts of alcohols, acetals, and other organic compounds. The hydroformylation stage products also contain unreacted olefins, carbon monoxide, and hydrogen and are removed from the hydroformylation stage by means of line 7. Cobalt carbonyl and alloying metal carbonyls such as iron, nickel, chromium, and molybdenum are also contained in the reaction products.

The reaction products at the hydroformylation temperature and pressure are passed by line 7 to cooler 8 and are cooled therein to a temperature of about 100° F. The cooled hydroformylation products are passed by line 9 to high-pressure separator 10. In high-pressure separator 10, a gas phase synthesis gas and a smaller amount of vapors of carbonyls and organic compounds are separated from a liquid phase comprising the remainder of the reaction products. The gas phase is removed by line 11 and is vented from the system by means of line 12 containing pressure regulating vent valve 13, pressure regulating valve 14 in line 15, which is also connected to outlet line 11, being closed. If desired, pressure regulating vent valve 13 can be partially or completely closed and part or all of the synthesis gas can be reduced in pressure in pressure regulating valve 14 and recycled to the hydroformylation stage through line 15 and through the demetallizing zone 16 and the recycle compressor 17 in valved synthesis gas recycle line 18.

The liquid hydroformylation stage products at a pressure of about 3500 pounds per square inch gauge and a temperature of about 100° F. are then passed by line 20 through pressure regulating valve 21 and are reduced therein to a pressure of about 450 pounds per square inch gauge. The hydroformylation stage products at the reduced pressure form a mixed phase in which gaseous synthesis gas is mixed with hydroformylation products which are liquid at 450 pounds per square inch gauge and 100° F. The mixed phase materials are passed by means of line 22 to the intermediate-pressure separator 23. In separator 23, a gas phase containing synthesis gas and a smaller amount of vapors of carbonyls and organic compounds at the intermediate pressure is separated from a liquid phase comprising the remainder of the reaction products including small amounts of carbon monoxide and hydrogen which are dissolved in the reaction products under the conditions of separation. The gas phase is removed by line 24, is reduced in pressure in pressure regulating valve 25, and is passed upwardly by line 26, pressure regulating vent valve 27 in vent line 28 being closed. Gases are passed by line 26 to the synthesis gas recycle line 18 and are returned by this line to the hydroformylation stage. If desired, pressure regulating vent valve 27 can be partially or completely opened and a portion or all of the synthesis gas can be vented through vent line 28.

The liquid hydroformylation stage products are removed from the intermediate-pressure separator 23 and are passed by line 31 and valved hydroformylation stage products inlet lines 32 and 32a at a pressure of about 450 pounds per square inch gauge and a temperature of about 100° F. to the demetalling towers 33 and 33a. The parts and lines of tower 33 are identified by numerals; similar parts and lines of tower 33a are identified by the same numerals with an "a" added. The demetalling towers are arranged so that either tower can be on stream while the other tower is not on stream or so that both are on stream in parallel. The operation of tower 33 will now be described, it being understood that tower 33a is operated in a similar manner. The upper portion 34 and the lower portion 35 of demetalling tower 33 contain a packing material such as pumice. Saturated steam at a pressure of about 450 pounds per square inch gauge and a temperature of about 460° F. is introduced by means of manifold 36, valved steam inlet line 37 and valved line 38 to a point near the bottom of demetalling tower 33. An inert gas such as hydrogen is introduced by hydrogen manifold 41, valved hydrogen inlet line 42 and valved line 43 to demetalling tower 33 at points above the point where the steam is initially introduced. Steam is introduced by line 37 and valved line 44 to line 46 and hydrogen is passed by valved line 51 to line 46. The resulting mixture of steam and hydrogen is introduced by line 46 into the demetalling tower 33 at a point vertically above the point where the inert gas is initially introduced by means of line 43. In like manner, steam is passed by line 37 and valved line 47 to line 48, hydrogen is passed by valved line 52 to line 48, and the mixture of steam and hydrogen is introduced into the demetalling tower 33 at a point above the point where the mixture of steam and hydrogen is introduced by line 46.

In the demetalling tower, the liquid hydroformylation products are heated from an initial temperature of 100° F. to a final temperature of about 340° to 420° F., a temperature gradient of from about 240° to about 320° F being established along the vertical length of the demetalling tower. In the upper portion of the tower 34, the hydroformylation products are heated in the range of 165° to 212° F., cobalt carbonyl is decomposed and cobalt is deposited upon the pumice, while in the lower portion of the tower 35, the hydroformylation products are heated to a temperature in the range of 340° to 420° F. and iron and other alloying metal carbonyls are decomposed with the consequent deposition of free metals upon the pumice in the lower portion of the demetalling tower. A mixture of the hydrogen introduced into the demetalling tower, and the hydrogen and carbon monoxide released in the demetalling tower from the hydroformulation stag products as they are heated, is removed and vented at a temperature of about 100° F. from the top of the demetalling tower by means of line 54 containing vent valve 56. The hydroformylation reaction products from which cobalt, iron and other alloying metal carbonyls have been removed as free metals, are passed from the demetalling tower 33 by means of valved hydroformylation stage products outlet line 57.

Demetalling tower 33 can be taken off stream by closing the valves in the valved hydroformylation stage products inlet line 32, the hydroformylation stage products outlet line 57, the valved steam inlet line 37, and the valved hydrogen inlet line 42, vent valve 56 being open. When the pressure has been reduced, the pumice in the upper portion of the demetalling tower containing the deposited cobalt is removed through manhole 58 which is positioned near the bottom of the upper portion of the demetalling tower. The pumice in the lower portion of the tower containing the alloying metals is removed through lower manhole 59 which is positioned in the bottom of the lower portion of the demetalling tower. In the event the pumice in the lower portion of the demetalling tower contains only a small amount of alloying metals, it is not necessary to also remove this packing material but instead only the pumice containing cobalt can be removed.

Cobalt can be recovered from the pumice removed from the upper portion of the demetalling tower. For example, cobalt can be removed by treating the pumice with a weak acid solution such as dilute nitric, hydrochloric or sulfuric acid. Dilute nitric acid is preferred because this acid dissolves the cobalt rapidly. Cobalt can also be recovered, if desired, from the pumice while the pumice is still in the tower. In order to accomplish this, carbon monoxide is introduced from carbon monoxide manifold line 61 and valved line 62 to valved line 57 and thence into the bottom portion of the tower. The carbon monoxide is supplied at the hydroformylation pressure and at a temperature of about 350° F. which is sufficiently high to decompose cobalt carbonyl but not the other metal carbonyls. The resulting stream of carbon monoxide containing cobalt carbonyl is removed from the top of the tower by vent line 54, vent valve 56 being closed, and is then recycled to the hydroformylation stage by cobalt carbonyl recycle lines 55 and 60.

As pointed out previously, tower 33a can be operated and closed down at the same time as tower 33, or the towers can be closed down in turn. The hydroformylation stage products which are removed substantially free of metal carbonyls from tower 33 or 33a by means of valved lines 57 or 57a are passed by line 71 to the cooler 73 where they are cooled to a temperature of about 100° F. The cooled substantially metal-free hydroformulation products are passed from the cooler by line 74 to the mechanical filter 76. In filter 76, pulverized and finely divided pumice and other solid particles are removed and discarded by means of line 77. This filter also breaks the emulsion formed by the aqueous and organic materials in the hydroformylation stage products. The mixture of reaction products is passed by line 78 to low-pressure trap 81. Synthesis gas is discharged from the top of the low-pressure trap by line 82 and is vented by vent valve 83 in vent line 84. If desired, a portion or all of the synthesis gas can be passed by line 86 containing valve 87 and by synthesis gas recycle line 18 to the hydroformylation stage. When the synthesis gas is being recycled, vent valve 83 in vent line 84 is partially or completely closed.

A water layer containing dissolved iron and alloying metal compounds is removed by means of line 91 and is discarded. Hydroformylation products free of carbon monoxide, hydrogen, catalytic metal and alloying metal carbonyls and at substantially atmospheric pressure and a temperature of about 100° F. are passed by line 92 containing recirculating pump 93 to the hydrogenation stage wherein the reaction products are adjusted to the desired hydrogenation pressure and temperature by heat exchangers and compressors, not shown.

The above-described embodiment can be varied within the scope of the invention. When the catalyst is originally introduced into the hydroformylation stage as a cobalt salt soluble in water, the water layer removed in line 91 also contains an appreciable amount of the cobalt salt. When the concentration of cobalt salt is sufficient, a part or all of the water layer in line 91 can be passed to a cobalt recovery system, not shown, in which the water layer is first concentrated to produce a slurry containing cobalt, iron, and alloying metal salts, and in which the cobalt is then separated from the other metal salts. The cobalt salts removed are concentrated, cobalt 2-ethylhexanoate or other similar compound is formed, and the resultant catalytic metal salt reintroduced to the hydroformylation stage. When the only gas recycled is that removed from a low-pressure separator which follows the demetalling tower, the demetalling zone 16 in recycle line 18 can be by-passed by line 94, the valve in valved line 18 being closed.

As stated previously, the synthesis gas removed in the high-pressure, the intermediate-pressure, or the low-pressure separator can be either vented or recycled.

The above embodiment can be employed when it is not necessary to remove both cobalt and alloying metals. For example, when it is desired only to remove cobalt, a preferred method is to adjust pressure regulating valve 21 to reduce the pressure to about 5 pounds per square inch gauge and to admit steam and hydrogen at about 5 pounds per square inch gauge into the demetalling towers 33 and 33a. The hydroformylation stage products under these conditions of operation are removed at a temperature of about 175° F., cobalt carbonyl being decomposed and cobalt being deposited upon the pumice. The hydroformylation products substantially free of cobalt are removed from the demetalling towers and are passed to the cooler 73 and then through filter 76 to the low-pressure separator 81 in the manner described above. When operating in accordance with this embodiment, the separator 23 functions not as an intermediate-pressure separator but rather as a low-pressure separator and separator 81 is used merely to separate the water layer from the layer containing the products which are passed to the hydrogenation stage, the hydroformylation products introduced into this separation unit 81 being substantially free of hydrogen and carbon monoxide.

The cobalt can be recovered from the decobalting towers in the manner pointed out above, either by removing the pumice containing the cobalt and recovering the cobalt, or by passing carbon monoxide at an elevated temperature through the demetalling towers and removing the cobalt as cobalt carbonyl from the top of the demetalling towers.

When iron is used as the catalytic metal or when the hydroformylation stage products introduced into the demetalling towers are substantially free of cobalt, the demetalling towers, as pointed out above, can be operated with a much smaller temperature gradient. The hydroformylation stage products can be introduced to the demetalling towers at a somewhat higher temperature such as a temperature below 300° and preferably in the range of 250° to 290° F. However, when operating in this manner, it is necessary to pass the inert gas through an additional separation unit, not shown, in order to recover the hydroformylation products which are removed with the inert gas from the top of the demetalling towers.

As pointed out previously, other inert gases such as nitrogen, methane or natural gas can be introduced to the demetalling towers.

When operating in accordance with the process of my invention, cobalt carbonyl is almost completely removed from hydroformylation stage products and iron and other alloying metal carbonyls are substantially completely removed. The amounts of alloying metals other than the amount of iron removed in the demetalling tower are difficult to measure directly but the amount of iron removed can be readily measured. The amount of iron removed is an excellent measure of the amounts of alloying metals removed because initially the other alloying metal carbonyls are formed when iron carbonyl is formed upon the disolution of small amounts of the alloys used in the hydroformylation stage and in the transfer lines. The amount of iron carbonyl remaining in the products removed from the demetalling tower, is also a measure of the amount of alloying metal carbonyls remaining because iron and alloying metal carbonyls are decomposed at temperatures in the range of 340° to 420° F. under substantially the same conditions.

The results of four runs in a 2½ inch inside diameter tower, 6 feet in height illustrate the advantages of the process of my invention. In each of the runs, 1800 milligrams per hour of hydroformylation stage products were introduced at the 5-foot level and 350 milliliters per hour of steam at a pressure of about 210 pounds per square inch gauge were introduced at the 1-foot level.

In the first three runs, the tower was packed to a height of 5½ feet with ¼ inch pumice and the hydroformylation stage products introduced to the tower contained 0.540 gram per liter of cobalt and 0.0783 gram per liter of iron. In the first run no hydrogen was introduced, in the second run 15 standard cubic feet per hour of hydrogen were introduced at the 2-foot level, and in the third run 25 standard cubic feet per hour of hydrogen were introduced at the same point. In each of the runs, the cobalt and iron contents of the hydroformylation stage products were substantially reduced, the products removed from the separation zone containing in each case 0.0001 gram per liter of cobalt and 0.0106, 0.0103, and 0.0209 gram per liter of iron, respectively. The variation in iron content is thought to be caused by variations in the time the hydroformylation stage products were allowed to stand before the oil and water phases were separated.

In the first run, in which no hydrogen was admitted, the temperature increased from 155° to 343° F. in a distance of one foot. When the temperature gradient varies from below 150° F. to above 300° F. in such a short vertical interval, the metals are not deposited in a uniform manner throughout the bed, but instead are deposited at the top of the bed and plug the tower. In the second run, where hydrogen was introduced at the 2-foot level, 2 feet along the packed tower were required for a temperature rise of from 160° to 346° F. and in the third run where even more hydrogen was introduced, 2½ feet were required for a temperature rise from 132° to 339° F.

In the fourth run, the tower was packed to a height of 5½ feet with Berl saddles and the hydroformylation stage products introduced into the packed tower contained 0.547 gram per liter of cobalt, 0.0785 gram per liter of iron, and a partial pressure of 300 pounds per square inch gauge of carbon monoxide and hydrogen. The same amount of hydroformylation stage products and the same amount of steam, 1800 milligrams per hour at the 5-foot level and 350 milliliters of steam at a pressure of about 210 pounds per square inch gauge at the 1-foot level, were introduced to the packed tower. When 15 standard cubic feet per hour of hydrogen were introduced at the 2-foot level, the cobalt content was reduced to 0.0001 gram per liter and the iron content to 0.0021 gram per liter. Two feet are required to increase the temperature from 129° F. to 356° F. and 1½ feet are required to heat it from 168° F. to 356° F. When operating in this manner, the temperature rise is gradual and excessive deposition of metal with resulting plugging of the top of the tower is avoided.

As pointed out previously, the number of points at which additional hydrogen and additional steam should be introduced varies with the length of the separation zone or tower. With a tower which is 6 feet long, such as the one used for the preceding run, it is not necessary to introduce steam and hydrogen at more than one point. When a larger tower is employed, it is desirable to introduce the inert gas at a number of points spaced in vertical relationship with respect to each other above the point where the hydrogen is originally introduced.

Preferred results are obtained when substantially pure steam is employed for heating the metal carbonyl of carbonyls but the steam can contain a small amount of volatile acids, preferably organic acids such as formic, acetic, and propionic acids.

The minimum total pressure employed in the separation zone or packed tower is fixed by the partial pressure of steam which is required to provide the desired temperature and the partial pressure of the hydroformylation stage products at the temperature employed. For example, as pointed out previously, when an embodiment is employed to remove only cobalt carbonyl, a partial pressure of steam of about one atmosphere is sufficient to provide a temperature in the range of 165° to 212° F. and because at that temperature the hydroformylation stage products have only a very small partial pressure, a total pressure of about one atmosphere is sufficient. When a temperature of from about 340° to about 420° F. is required to remove alloying metal carbonyls, a partial pressure of steam of from 100 to 300 pounds per square inch gauge is required and at that temperature, hydroformylation stage products have a partial pressure of from about 30 to 150 pounds per square inch gauge, depending upon their composition. A total pressure of from 130 to 450 pounds per square inch gauge is thus required. However, higher total pressures can be employed, if desired, by introducing additional inert gas at points along the separation zone or by originally introducing a mixture of steam and inert gases into the bottom of the separation zone and introducing additional inert gas and additional steam, if desired, at at least one more point along the separation zone.

The packing employed in the tower can be any suitable material conventionally used for aiding contact between liquids and gases. It may be either porous or non-porous provided it is non-reactive with the materials in the tower. Additional examples of suitable packing materials are, Raschig rings, crushed rock, crushed quartz, and the like.

Obviously many modifications and variations of the invention as hereinbefore set forth can be made without departing from the spirit and scope thereof, and therefore, only such limitations should be imposed as are indicated in the appended claims.

I claim:

1. A process for removing at least one metal carbonyl from hydroformylation stage products containing at least one metal carbonyl which comprises passing said hydroformylation stage products initially at a temperature below the decomposition temperature of the metal carbonyl with the lowest decomposition temperature downwardly from the upper portion of an elongated separation zone containing packing material, passing steam upwardly from a point in the lower portion of said separation zone, passing inert gas upwardly from at least one point above the first-named point where said steam is introduced, causing cooling and condensation of said steam by contacting said steam with said hydroformylation stage products and said packing material and by reducing the partial pressure of said steam with said inert gas, the amount and pressure of said steam and the amount and temperature of said inert gas being adjusted to heat the hydroformylation stage products in the separation zone at least to the decomposition temperature of the metal carbonyl with the lowest decomposition temperature to form at least one free metal and deposit said metal on said packing material.

2. A process for removing cobalt carbonyl from hydroformylation stage products containing cobalt carbonyl which comprises passing said hydroformylation stage products initially at a temperature below the decomposition temperature of cobalt carbonyl downwardly from the upper portion of an elongated separation zone containing packing material, passing steam upwardly from a point in the lower portion of said separation zone, passing inert gas upwardly from at least one point above the first-named point where said steam is introduced, causing cooling and condensation of said steam by contacting said steam with said hydroformylation stage products and said packing material and by reducing the partial pressure of said steam with said inert gas, the amount and pressure of said steam and the amount and temperature of said inert gas being adjusted to heat the hydroformylation stage products in the reaction zone above the decomposition temperature of cobalt carbonyl to form free cobalt and deposit said free cobalt on said packing material.

3. A process for removing cobalt carbonyl from hydroformylation stage products containing cobalt carbonyl which comprises passing said hydroformylation stage products initially at a temperature below about 150° F. downwardly from the upper portion of an elongated separation zone containing packing material, passing steam upwardly from a point in the lower portion of said separation zone, passing inert gas upwardly from at least one point above the first-named point where said steam is introduced, causing cooling and condensation of said steam by contacting said steam with said hydroformylation stage products and said packing material and by reducing the partial pressure of said steam with said inert gas, the amount and pressure of said steam and the amount and temperature of said inert gas being adjusted to heat the hydroformylation stage products in the reaction zone to a temperature of about 165° to 212° F. to form free cobalt and deposit said free cobalt on said packing material.

4. A process for removing cobalt carbonyl from hydroformylation stage products containing cobalt carbonyl which comprises passing said hydroformylation stage products initially at a temperature of about 100° to 120° F. downwardly from the upper portion of an elongated separation zone containing pumice, passing steam upwardly from a point in the lower portion of said separation zone, passing hydrogen upwardly from a point above the first-named point where said steam is introduced, introducing additional steam and additional hydrogen at points spaced vertically above the point where the hydrogen is initially introduced, causing cooling and condensation of the steam by contacting said steam with said hydroformylation stage products and said packing material by reducing the partial pressure of said steam with the hydrogen, the amount and temperature of said steam and the amount and temperature of said hydrogen being adjusted to heat the hydroformylation stage products in the reaction zone to a temperature of about 212° F. to form free cobalt and deposit said free cobalt on said packing material.

5. A process for removing cobalt and alloying metal carbonyls from hydroformylation stage products containing cobalt and alloying metal carbonyls which comprises passing said hydroformylation stage products initially at a temperature below the decomposition temperature of cobalt carbonyl downwardly from the top of an elongated separation zone containing packing material, passing steam upwardly from a point in the bottom of said separation zone, passing inert gas upwardly from at least one point spaced vertically above said first-named point where said steam is introduced, causing cooling and condensation of said steam by contacting said steam with said hydroformylation stage products and said packing material and by reducing the partial pressure of said steam with said inert gas, the amount and pressure of said steam and the amount and temperature of said inert gas being adjusted to heat the hydroformylation stage products in an upper portion of the reaction zone above the decomposition temperature of cobalt carbonyl to form free cobalt and deposit said free cobalt on said packing material in said upper portion of said separation zone, and to heat the hydroformylation stage products in the lower portion of the reaction zone above the decomposition temperature of alloying metal carbonyls to form free alloying metals and deposit said free alloying metals on said packing material in said lower portion of said separation zone.

6. A process for removing cobalt and alloying metals from hydroformylation stage products containing cobalt carbonyl and alloying metal carbonyls which comprises passing said hydroformylation stage products initially at a temperature below about 150° F. downwardly from the top of an elongated separation zone containing packing material, passing steam upwardly from a point in the bottom of said separation zone, passing an inert gas upwardly from a point spaced vertically above said first-named point where said steam is introduced, causing cooling and condensation of said steam by contacting said steam with said hydroformylation stage products and said packing material and by reducing the partial pressure of said steam with said inert gas, the amount and pressure of said steam and the amount and temperature of said inert gas being adjusted to heat the hydroformylation stage products in an upper portion of the reaction zone to a temperature of about 165° to 212° F. to form free cobalt and deposit said free cobalt on said packing material in said upper portion of said separation zone, and to heat said hydroformylation stage products in the lower portion of the separation zone above the decomposition temperature of alloying metal carbonyls, form free alloying metals, and deposit said free alloying metals on said packing material in said lower portion of said separation zone, and separately recovering said cobalt from said packing material in said upper portion of the separation zone.

7. A process for removing cobalt and alloying metal carbonyls from hydroformylation stage products containing cobalt and alloying metal carbonyls which comprises passing said hydroformylation stage products initially at a temperature of about 100° to about 120° F. downwardly from the top portion of an elongated separation zone containing pumice and maintained at a separation pressure of about 200 pounds per square inch gauge, passing steam initially at said separation pressure upwardly from a point in the lower portion of said separation zone, passing hydrogen at said separation pressure and a temperature of about 100° F. upwardly from at least one point above the first-mentioned point where said steam is introduced, introducing additional steam and hydrogen at points spaced vertically above said second-named point where said hydrogen is initially introduced, causing cooling and condensation of said steam by contacting said steam with said hydroformylation stage products and said pumice and by reducing the partial pressure of said steam with said hydrogen, the amount and pressure of said steam and the amount and temperature of said hydrogen being adjusted to heat the hydroformylation stage products in an upper portion of the reaction zone to about 165° to about 212° F. to decompose said cobalt carbonyl to form cobalt, and deposit said free cobalt on said pumice in said upper portion of said separation zone and to heat said hydroformylation stage products in a lower portion of the separation zone to about 340° to about 420° F. to decompose said alloying metal carbonyls, form free alloying metals, and deposit said free alloying metals on said pumice in said lower portion of said separation zone, and separately recovering said pumice upon which cobalt is deposited and said pumice on which alloying metals are deposited and recovering cobalt from said pumice upon which the cobalt is deposited.

References Cited in the file of this patent

UNITED STATES PATENTS

| | | |
|---|---|---|
| 2,508,743 | Bruner | May 23, 1950 |
| 2,514,961 | Max | July 11, 1950 |
| 2,530,989 | Parker | Nov. 21, 1950 |

OTHER REFERENCES

Bureau of Mines R. I. 4270 (page 6) June 1948.